(12) United States Patent
Schiller et al.

(10) Patent No.: US 6,318,414 B1
(45) Date of Patent: Nov. 20, 2001

(54) SOLENOID VALVE FOR AIR NOZZLE WEAVING MACHINES

(75) Inventors: Peter Schiller, Lindau; Dieter Teufel, Langenargen, both of (DE)

(73) Assignee: Lindauer Dornier Gesellschaft mbH, Lindau (DE)

( * ) Notice: Subject to any disclaimer, the term of this patent is extended or adjusted under 35 U.S.C. 154(b) by 0 days.

(21) Appl. No.: 09/579,518

(22) Filed: May 26, 2000

(30) Foreign Application Priority Data

May 28, 1999 (DE) .......................................... 299 09 223 U

(51) Int. Cl.[7] .................................................. D03D 47/30
(52) U.S. Cl. .......................................... 139/435.4; 239/583
(58) Field of Search ........................ 139/435.4; 239/412, 239/583

(56) References Cited

U.S. PATENT DOCUMENTS 4,466,468 * 8/1984 Brouwer et al. ................... 139/435.4
4,848,416 * 7/1989 Tholander ......................... 139/435.4
5,111,852 * 5/1992 Verhulst ............................. 139/435.4

* cited by examiner

Primary Examiner—Andy Falik
(74) Attorney, Agent, or Firm—Crowell & Moring, LLP

(57) ABSTRACT

A solenoid valve, particularly for use in air nozzle weaving machines, has a valve housing with at least one valve inlet and at least one valve outlet. An electromagnetically actuated valve body is arranged in a passage area between the valve inlet and the valve outlet. In order to permit a fast and operationally reliable exchange of the parts of the solenoid valve subjected to wear, it is provided that a fastening flange, the valve body, as well as the electromagnetic drive together form a first valve subassembly which is subjected to a rapid exchange. The valve housing with its connections forms a second valve subassembly which is fixedly arranged on the machine.

12 Claims, 2 Drawing Sheets

SOLENOID VALVE FOR AIR NOZZLE WEAVING MACHINES

BACKGROUND AND SUMMARY OF INVENTION

This application claims the priority of German patent application 29909223.2, filed May 28, 1999, the disclosure of which is expressly incorporated by reference herein.

The invention relates to a solenoid valve, particularly for a use in weaving machines. Solenoid valves of this type are used, for example, in air nozzle weaving machines, for steering the pneumatic woof yarn feeding medium to the main and auxiliary blow nozzles.

In the simplest case, a solenoid valve consists of a valve housing in which the valve chamber is arranged with the valve inlet and the valve outlet. In the closed condition of the valve, the valve inlet and the valve outlet are separated from one another by a valve disk disposed on a valve seat. The valve disk is driven by an electromagnetically actuated control element and can be lifted off the valve seat such that the passage between the valve inlet and the valve outlet is opened up. The valve inlet and outlet are connected with hose or tube connections for feeding and removing a pressure medium. The electric connection for the electromagnetic drive takes place by way of a corresponding connecting line.

If a defect occurs in the case of such a solenoid valve, it has been necessary to either exchange the entire valve or to at least remove the valve in order to be able to exchange the defective parts. This resulted in the disadvantage that the connections for the pressure medium to the valve inlet and the valve outlet as well as the electric connecting line had to be pulled off before the removal of the valve, which leads to considerable expenditures particularly in the case of installation positions which are difficult to access. In the case of air nozzle weaving machines, it is impossible during the weaving operation to access the solenoid valves used for controlling the auxiliary blow nozzles, because these solenoid valves are covered by the web of woven fabric moving directly over them.

Another disadvantage is the fact that, when individual components, such as the valve disk, are exchanged, the observance of the specified tolerances, as, for example, switching times, valve lift, etc., is not ensured if old components are paired with new exchange elements.

It is an object of the invention to improve a solenoid valve of the initially mentioned type such that the components subjected to wear can be rapidly exchanged.

This object is achieved according to preferred embodiments of the invention by providing a solenoid valve, particularly for a use in air nozzle weaving machines, comprising:

a valve housing with a fluid input, a fluid output and having electric contact bushes, a first valve body which is arranged in the valve housing and which connects an inflow-side hollow space of the first valve housing by an inlet integrated in the valve body with an outflow-side valve chamber, a second valve body for controlling a fluid flow between the valve chamber and a coaxial outlet in the first valve body, and a fastening flange which can be rapidly connected with the valve housing and which, facing the valve housing, carries the first valve body and which, facing away from the valve housing, carries an electromagnetic drive, the drive having electric contact elements for the rapid connection with the electric contact bushes, wherein the fastening flange, the first valve body and the second valve body as well as the electromagnetic drive together form a first valve subassembly which is subjected to a rapid exchange, and wherein the valve housing with its connections forms a second valve subassembly which in use is fixedly arranged on the weaving machine.

The invention is based on the fact that a first valve body is sealingly accommodated in a hollow space of the valve housing, in which case at least one inlet and one outlet for a pressure medium lead into the hollow space of the valve housing, which inlet and outlet can be connected in a controlled manner inside the valve housing.

As the result of the essentially two-part construction of the solenoid valve, specifically the valve housing, which has the connections for feeding and removing the pressure medium to be steered, the first valve body arranged in the valve housing, and, on the other hand, the second valve body which carries out the actual valve functions, it is advantageously achieved that an exchange of the built-in valve parts can be carried out without the removal of the connections for the pressure medium, such as hoses and pipes.

When the first and second valve body are inserted, a fastening flange connected with the first valve body rests against the valve housing, in which case the valve housing and the fastening flange are connected with one another by means of rapidly releasable fastening devices.

The first valve body, the fastening flange and the electromagnetic drive together advantageously form a valve subassembly which can be exchanged as a unit.

Between the first valve body and the valve housing, seals are arranged which, on the one hand, provide a sealing off of the valve chamber toward the outside and, on the other hand, seal off the inlet and the outlet of the valve chamber with respect to one another.

An easy exchangeability of the valve subassembly is also promoted by the fact that a plug-type connector with electric contacts is arranged on the valve subassembly, which plug-type connector interacts with a counterpart arranged on the valve housing. The plugging of the valve subassembly into the valve housing simultaneously establishes the electric connection for driving the valve.

Another advantage of the invention is the fact that a fast and easy exchange of the defective valve subassembly can be carried out in that the quick fastening between the valve subassembly and the valve housing is released and the entire valve subassembly can be exchanged without requiring a high-expenditure demounting of the valve. Also, no loose single parts occur during the exchange of the valve subassembly, which may possibly be lost.

In addition, the valve subassembly is a pretested and operable unit so that, when it is exchanged, no subsequent testing of the exchanged valve subassembly is required. The risks of tolerance differences between the old and the new parts, which may impair the operability of the valve, are therefore eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
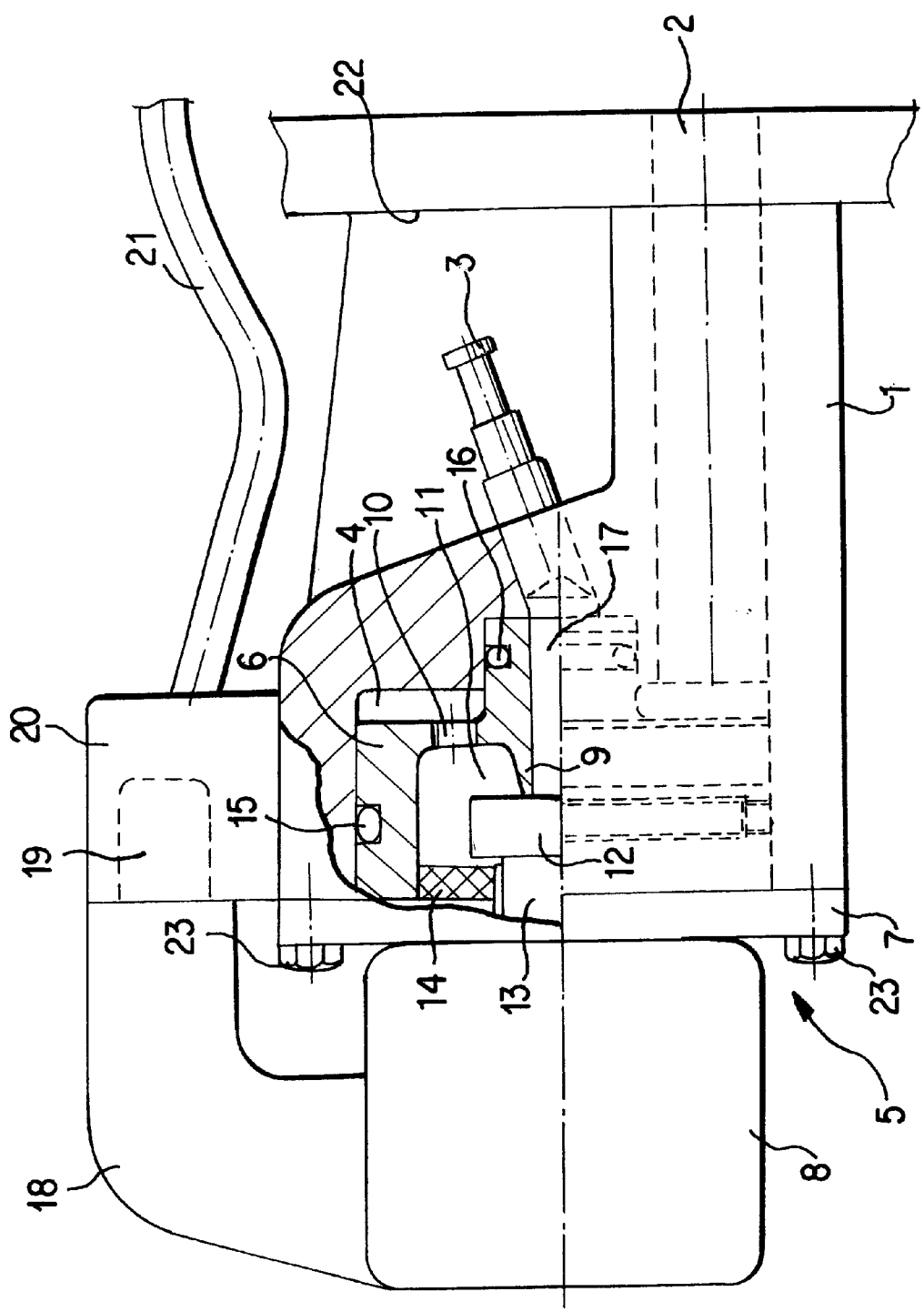
FIG. 1 is a semisectional view of a solenoid valve construction according to preferred embodiments of the invention.

The solenoid valve has an essentially two-part construction and, on the one hand, comprises a valve housing 1 with an approximately pot-shaped hollow space 4 which is open on one side. An inlet 2, through which a pressure medium is fed, leads into the hollow space 4, as well as an outlet 3 for discharging the pressure medium. The pressure medium is fed and removed by way of pipes which are not shown.

The valve housing 1 is fastened on a surface 22 which is formed, for example, by the wall of the compressed-air tank of an air nozzle weaving machine, which compressed-air tank is situated below the weaving plane.

On the other hand, the solenoid valve comprises a valve subassembly 5 essentially consisting of a first valve body 6 which forms a valve chamber 11 with an inlet 10 and an outlet 17 for the pressure medium. On one side, the valve body 6 is arranged on a fastening flange 7 which is adjoined by an electromagnetic drive 8 for actuating a second valve body 12, 13.

The second valve body 12, 13 is guided in the valve chamber 11 while being sealed off toward the outside and comprises a valve stem at whose end a valve disk is arranged. In the closed condition of the valve, the valve disk rests in a sealing manner against the valve seat 9, the inlet 10 being separated from the outlet 17 of the valve. A damper 14 provides a damping of the valve disk impact when the valve is open.

According to the invention, the first valve body 6 is accommodated in the hollow space 4 of the valve housing 1, the inlet 10 of the valve body 6 being connected by way of the hollow space 4 with the input 2 of the valve housing 1, and the outlet 17 of the valve body 6 being connected directly with the output of the valve housing 1. The outside wall of the valve body 6 rests against the inside wall of the valve housing 1 and is sealed off toward the outside by means of a seal 15. The area between the inlet 10 and the outlet 17 is also sealed off by a seal 16 arranged between the outside wall of the valve body 6 and the inside wall of the valve housing 1.

Figure 2:
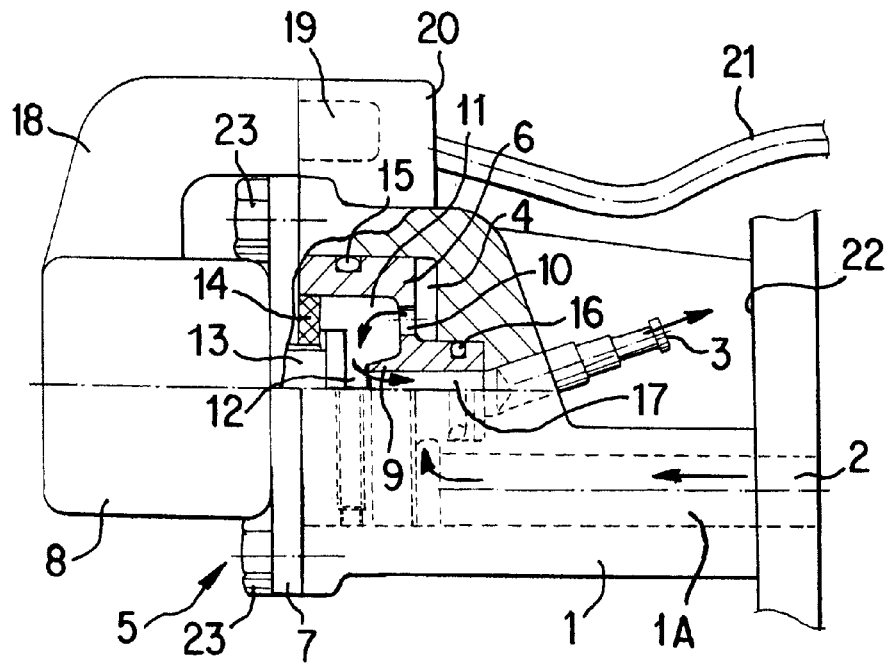
FIG. 2 is a semisectional view similar to FIG. 1 but indicating a flow of compressed air by arrows.

In FIG. 2 of the drawing figures, the flow of compressed air is indicated by arrows. In this case, the second valve body 12, 13 is in a position withdrawn from the valve seat 9 of the first valve body 6. This results in a flow of the compressed air from the inlet 2 to the outlet 3 of the valve housing 1.

Figures 3, 4:
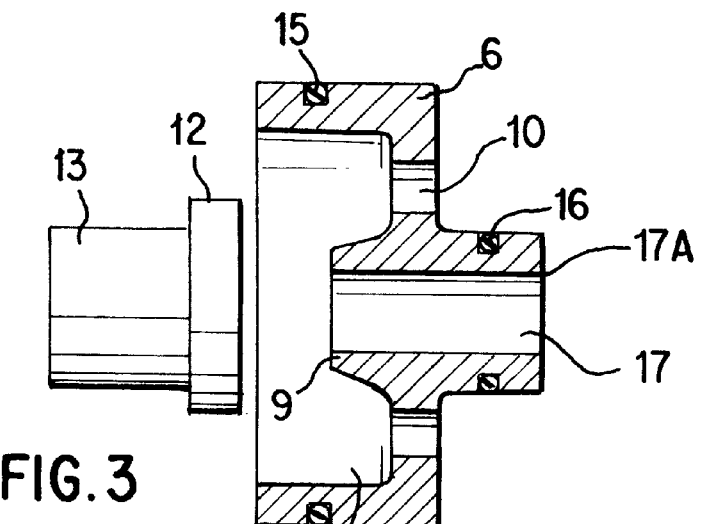
FIG. 3 is an illustration of the second valve body according to the invention.
FIG. 4 is an illustration of the first valve body according to the invention.

In FIG. 3 of the drawing figures, the second valve body 12, 13 is illustrated. The second valve body is a component part which is acted upon by the electromagnetic drive 8.

FIG. 4 of the drawing figures shows the first valve body 6 with seals 15, 16 placed in grooves, which have no reference numbers. In the installed condition, a hollow space 4 is formed between the first valve body shown in FIG. 2 and the valve housing 1, and at least one flow duct 1A, which starts from the inlet 2, leads into this hollow space 4. At least one inlet 10 situated in the edge area of the bottom of the pot-shaped hollow space 4 connects the hollow space 4 with the valve chamber 11. Starting from the bottom of the valve chamber 11, a truncated-cone-shaped projection protrudes into the valve chamber 11, whose free end forms the circular-ring-shaped valve seat 9.

A rotationally symmetrical extension extends coaxially in a direction opposite to the truncated-cone-shaped projection. A centrally arranged flow duct 17, whose outlet 17A leads into the outlet 3 of the valve housing 1, connects the valve seat 9 and the end of the extension. The outer circumference of the longitudinal section forming the pot-shaped hollow space and the outer circumference of the extension of the valve body 6 have ring grooves in which seals 15 and 16 are accommodated.

The fastening flange 7 of the valve subassembly 5 rests against the valve housing 1 and is fastened, for example, by means of quick-release screws 23. However, any other quick-release fastening can also be used.

For exchanging the valve subassembly 5, only the fastening screws 23 on the fastening flange 7 must be unscrewed so that the valve subassembly 1 can be removed from the valve housing 1. This does not affect the connections for the pressure medium which are situated on the valve housing 1; that is, these connections do not have to be removed when the valve subassembly 5 is exchanged.

A pulling-off of the electric connections for the drive 8 of the valve is also not required when the valve subassembly 5 is exchanged. This is achieved in that a plug-type connector 18 is arranged between the valve subassembly 5 and the valve housing 1. When the valve subassembly 5 is pushed into the valve housing 1, electric contacts 19 provided on the valve subassembly 5 engage with assigned contact bushes 20 and therefore establish an electric connection between the connecting line 21 and the electromagnetic drive 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Solenoid valve for use in air nozzle weaving machines, comprising:
    a valve housing with a fluid input, a fluid output and having electric contact bushes,
    a first valve body which is arranged in the valve housing and which connects an inflow-side hollow space of the valve housing by an inlet integrated in the valve body with an outflow-side valve chamber,
    a second valve body for controlling a fluid flow between the valve chamber and a coaxial outlet in the first valve body, and
    a fastening flange which can be rapidly connected with the valve housing and which, facing the valve housing, carries the first valve body and which, facing away from the valve housing, carries an electromagnetic drive, the drive having electric contact elements for the rapid connection with the electric contact bushes,
    wherein the fastening flange, the first valve body and the second valve body as well as the electromagnetic drive together form a first valve subassembly which can be subjected to a rapid exchange, and
    wherein the valve housing with its connections forms a second valve subassembly which in use is adapted to be fixedly arranged on the weaving machine.

2. Solenoid valve according to claim 1, wherein the fastening flange is detachably connected with the valve housing by a plurality of screw connectors.

3. Solenoid valve according to claim 1, wherein the fluid input is adapted to extend from a weaving machine support side of the valve housing.

4. Solenoid valve according to claim 3, wherein the fastening flange is detachably connected with the valve housing by a plurality of screw connectors.

5. Solenoid valve according to claim 4, wherein the valve housing and the electric contact bushes have planar connecting surfaces which abut facing planar surfaces of the electromagnetic drive and the electric contact elements thereof.

6. Solenoid valve according to claim 5, wherein the fastening flange is detachably connected with the valve housing by a plurality of screw connectors.

7. Solenoid valve according to claim 5, wherein the fluid input is adapted to extend from a weaving machine support side of the valve housing.

8. Solenoid valve according to claim 7, wherein the fastening flange is detachably connected with the valve housing by a plurality of screw connectors.

9. Solenoid valve for controlling air flow in an air nozzle weaving machine, comprising:

a valve housing with a fluid input and fluid output, a movable valve body for controlling fluid flow between the fluid input and the fluid output, an electromagnetic drive operable to control movement of the movable valve body, and a fastening flange adapted to be rapidly connected and disconnected to the valve housing, said movable valve body being carried by the fastening flange at a side thereof facing the valve housing, said electromagnetic drive being carried by the fastening flange at a side thereof facing away from the valve housing, wherein the fastening flange, the moveable valve body and the electromagnetic drive form a first valve subassembly for a rapidly exchangeable connection with the valve housing, and wherein the valve housing forms a second valve subassembly which in use is adapted to be fixedly arranged on a weaving machine.

10. Solenoid valve according to claim 9, wherein the fastening flange is detachably connected with the valve housing by a plurality of screw connectors.

11. Solenoid valve according to claim 9, wherein electric contact bush means are connected with the valve housing and form a detachable connector for connecting with plug in type electric contacts of the electromagnetic drive carried by the fastening flange.

12. Solenoid valve according to claim 11, wherein the fastening flange is detachably connected with the valve housing by a plurality of screw connectors.

* * * * *